United States Patent

Srivastava et al.

[15] 3,685,033

[45] Aug. 15, 1972

[54] BLOCK ENCODING FOR MAGNETIC RECORDING SYSTEMS

[72] Inventors: Keshava Srivastava, Waltham, Mass.; Ashok K. Agrawala, Roseville, Minn.

[73] Assignee: Honeywell Inc., Minneapolis, Minn.

[22] Filed: Aug. 24, 1970

[21] Appl. No.: 66,199

[52] U.S. Cl. ............340/174.1 G, 178/2 B, 178/113, 340/174.1 A, 340/347 DD

[51] Int. Cl. ......G11b 5/06, H03k 13/258, H04l 3/02

[58] Field of Search .340/174.1 R, 174.1 A, 174.1 G, 340/347 DD; 346/74 M; 178/113, 2 B

[56] References Cited

UNITED STATES PATENTS

| | | | |
|---|---|---|---|
| 3,564,557 | 2/1971 | Ruthazer | 340/174.1 A |
| 3,287,704 | 11/1966 | Bains | 340/347 DD |
| 3,226,685 | 12/1965 | Potter | 340/174.1 G |
| 3,374,475 | 3/1968 | Gabor | 340/174.1 R |

*Primary Examiner*—Howard W. Britton
*Attorney*—Fred Jacob and Ronald T. Reiling

[57] ABSTRACT

This specification discloses a high density recording and reproducing system wherein the effective packing density is increased by a generalized code which increases the number of bits per transition on the recording medium. The data is encoded in blocks so that n bits of information are transmitted with an allowed (2*n*—1) bits so that the total number of reversals in the recording medium is a minimum.

23 Claims, 44 Drawing Figures

INVENTORS
KESHAVA SRIVASTAVA
ASHOK K. AGRAWALA
BY
Nicholas Prasinos
ATTORNEY

INVENTORS
KESHAVA SRIVASTAVA
ASHOK K. AGRAWALA
BY
Nicholas Prasinos
ATTORNEY

INVENTORS
KESHAVA SRIVASTAVA
ASHOK K. AGRAWALA
BY
Nicholas Prasinos
ATTORNEY

INVENTORS
KESHAVA SRIVASTAVA
ASHOK K. AGRAWALA
BY
Nicholas Prasinos
ATTORNEY

INVENTOR.
KESHAVA SRIVASTAVA
ASHOK K. AGRAWALA
BY
Nicholas Prasinos
ATTORNEY

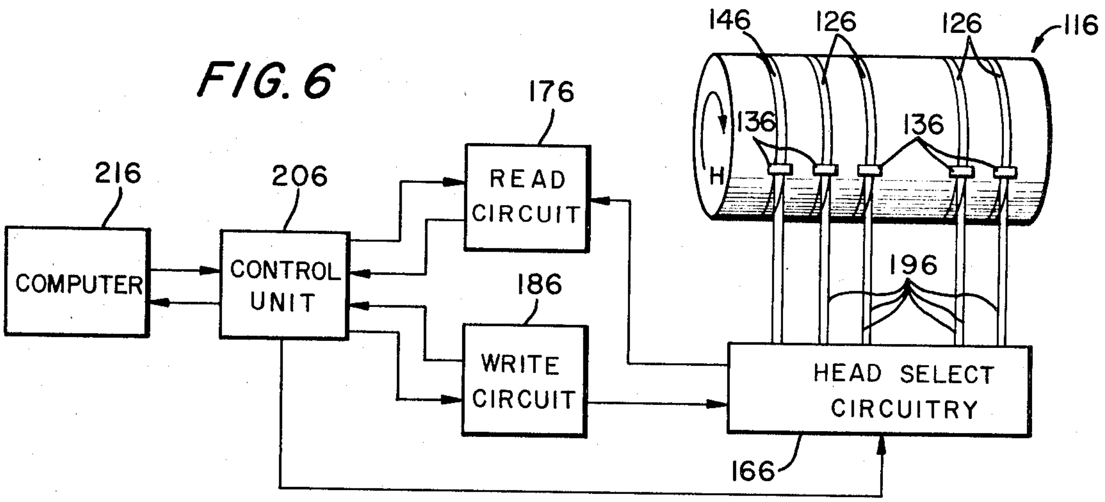
FIG. 6
| $\alpha$ | $\beta$ | $\gamma$ | A | B | C | D | E |
|---|---|---|---|---|---|---|---|
| 0 | 0 | 0 | 1 | 0 | 0 | 0 | 0 |
| 0 | 0 | 1 | 1 | 0 | 1 | 0 | 0 |
| 0 | 1 | 0 | 0 | 1 | 0 | 0 | 0 |
| 0 | 1 | 1 | 0 | 1 | 0 | 0 | 1 |
| 1 | 0 | 0 | 0 | 0 | 1 | 0 | 0 |
| 1 | 0 | 1 | 0 | 0 | 1 | 0 | 1 |
| 1 | 1 | 0 | 0 | 0 | 0 | 1 | 0 |
| 1 | 1 | 1 | 0 | 0 | 0 | 0 | 1 |
FIG. 7
$$A = \bar{\alpha}\bar{\beta}$$
$$B = \bar{\alpha}\beta$$
$$C = \bar{\alpha}\bar{\beta}\gamma + \alpha\bar{\beta}$$
$$D = \alpha\beta\bar{\gamma}$$
$$E = \bar{\alpha}\beta\gamma + \alpha\gamma$$
FIG. 8
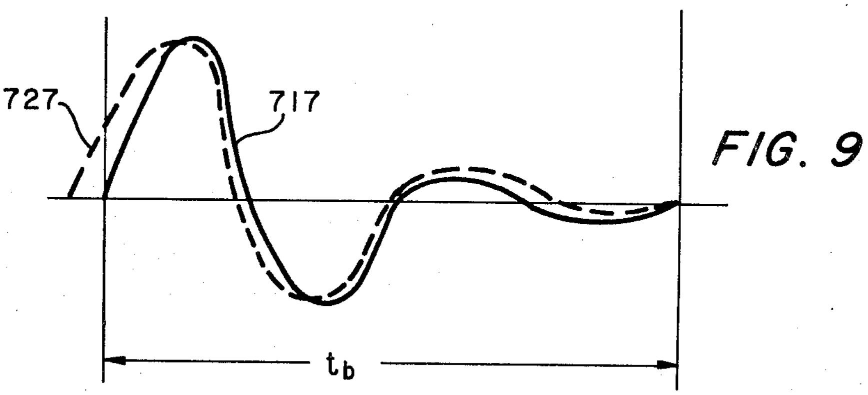
FIG. 9
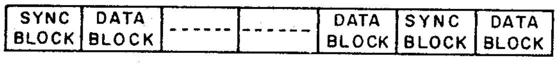
FIG. 10
INVENTORS
KESHAVA SRIVASTAVA
ASHOK K. AGRAWALA
BY Nicholas Prasinos
ATTORNEY FIG. 11i $\alpha = \bar{A}\bar{B}$ FIG. 11j $\beta = B + D + \bar{C}\bar{E}$ FIG. 11k $\gamma = E + AC$ INVENTORS
KESHAVA SRIVASTAVA
ASHOK K. AGRAWALA
BY
Nicholas J. Pisano
ATTORNEY

BLOCK ENCODING FOR MAGNETIC RECORDING SYSTEMS

BACKGROUND OF THE INVENTION

This invention pertains generally to data processing systems and more particularly to the high density storage of information on magnetic media such as tapes, disks, and drums.

In most data processing systems, digital information in the form of discreet voltage levels vary the magnetic head recording current and hence, induce predetermined patterns of remnant magnetic flux in the surface of the magnetic medium, which are representative of the stored information in the medium. A variety of modulation schemes for recovering information on magnetic media are known.

One early modulation scheme is the RB or return-to-bias scheme. This system consists basically of the presence of a positive pulse at clock time to represent a "1", and by the absence of a pulse at clock time to represent a "0". In this system, the magnetic surface encounters two flux transitions per bit of stored information resulting in reduced storage packing density.

Another magnetic recording technique applicable to a single track of a recording medium is return-to-zero (RZ) recording. In this system, the recording head receives positive pulse current to represent a "1" and negative pulse current to represent "0" with no bias current supplied. However, with this method of recording, there is no increase of packing density over RB, but it is self-clocking since there is a change of state of the magnetic surface for each bit. It is, however, dependent on tape velocity since for a given pulse width the width of recorded flux depends on how fast the tape passes by the recording head. However, since there is always a transition, either positive or negative for a "1" or "0", it is not subject to "drop-ins" or unwanted bits due to head-to-tape separation, but the circuitry is somewhat more complex than that utilized for RB recording.

The most commonly used system of magnetic recording on a track in a magnetic medium is NRZ, or non-return-to-zero. Variations of this system are the NRZ-M (non-return-to-zero-mark), NRZ-I (non-return-to-zero-inverse), and NRZ-C (non-return-to-zero-change). In the NRZ system, generally, the current direction in the magnetic recording head is unimportant; what is important is that the current shifts from one level to another for a "1" so as to cause the flux to saturate at the opposite level of saturation. Hence, a "1" would be represented by the current in the magnetic head switching from +Im to −Im, of from −Im to +Im; whereas a "0" is represented by no shift. Note that in this system only one flux change per bit is required resulting in a higher pulse packing density, but the system is not self-clocking, therefore a clock track must be provided along with the data tracks.

Another popular encoding system is the PE or PM system (phase encoding or phase modulation). This system consists generally of a positive current transition at the bit cell center for a "1" and a negative transition for a "0" (A bit cell is herein defined as one interval along an information track when that track is divided into several equal lengths; they may also be regarded as time periods as the track moves beneath the recording head.) This system is sometimes known as "-double-pulse" technique because two flux changes are recorded for each bit. With this system, despite the requisite two flux changes per bit, greater bit density is possible since the random sequences of "1's" and "0's" in data produces with wide frequency bands in NRZ type of recording, but only about one octave band width for the double-pulse technique. Typically, for example, NRZ techniques may have packing densities of 800 bits per inch and bit rates of 120,000 per second, whereas phase modulation techniques reliably generate bit packing densities up to 1,500 bits per inch and bit rates of 300,000 bits per second.

A very popular variation of the "double-pulse" technique is the "two-frequency" modulation method. In this system, there is a flux reversal at every bit cell boundary, and if the bit cell is "0", there is no flux reversal between the boundaries of that cell; but if the bit cell is "1", then there is a flux reversal at the center point of the cell. Once again, the direction of flux reversal has no significance, but only its time or space relationship conveys its meaning. It can be seen here, that a series of "1's" result in twice the pulse repetition rate than with a series of "0's" — hence, the name "two-frequency" modulation. This system is self-clocking (the series of flux reversals constituting a recorded track is interpreted without reference to a separate clock track), provides greater packing density, and since the band width is kept substantially to one octave, relatively narrow band filtering may be used to improve the signal to noise ratio. This scheme was perhaps one of the first wherein the position within the bit cell was utilized to supply meaningful information.

A more recent method for utilizing position within a bit cell or cells is disclosed in the patent of A. Gabor on a "High Density Recording System", No. 3,374,475, and issued Mar. 19, 1968. In this system, information bits are recorded at a ratio of two information bits in the track for each clock pulse, wherein the binary digits of information are divided into pairs, with each pair being represented by the flux transitions and three adjacent positions in the track where the flux transitions can occur. However, as will be later developed mathematically, this represents 240 reversals per 384 bits or 0.62 flux reversals per bit, whereas substantially better results can theoretically be obtained as is to be hereinafter shown by applying information theory to the problem.

J. T. Potter et al. in U.S. Pat. No. 3,226,685, issued Dec. 28, 1965, reviews some two bit binary schemes of Barber and Gabor and discloses "methods and means for recording and reproducing information in ternary, quartenary, or higher order forms." It appears, however, that increasing the effective density of recording on a medium of the type systems disclosed by Potter and Gabor is based on the proposition of increasing the ratio of information transitions to the clock transitions in order to retain the self-clocking characteristics of the system. (See U.S. Pat. No. 3,226,685, column 1, lines 51–68.) It can, therefore, be appreciated that a practical upper limit of transitions to clock pulses is rapidly attained before crowding affects become dominant and the adoption of higher information density codes result in a situation where the preservation of adequate margin in reading become more difficult if not impossible; or the encoding-decoding scheme introduces modifications to the coding system, or even varying the code, which requires special rules such as for example in the above mentioned Gabor U.S. Pat. No. 3,374,475, column 4, lines 50–75, and column 5, lines 1–30, in order to avoid pulse crowding affects.

Another major constriction toward greater increases in packing density with the Gabor and Potter concepts is the requirement of a self-clocking system which inherently sacrifices part of the information carrying pulses to the clocking pulses and consequently reduces the storage capacity of information.

Accordingly, one object of the present invention is to provide an improved system for recording and reproducing information on a recording medium.

Another object of the present invention is to provide a recording system which increases the information density stored on a recording medium.

Still another object is to provide method and means for encoding digital signals in blocks so that the total number of flux transitions in the recording medium is kept to a minimum while the information stored in the recording medium is kept to a maximum.

BRIEF DESCRIPTION OF THE INVENTION

These and other objects of the invention are achieved by providing an encoding and decoding system wherein data is handled in blocks. A data block of bits is converted into a unique sequence of flux reversals such that the total number of flux reversals is kept to a minimum while the information stored in a recording medium is kept to a maximum. For example, if a "1" transmitted corresponds to a flux reversal in the material and a "0" corresponds to no flux reversal, by restricting the total number of "1's" for a fixed number of bits, a higher bit packing density is achieved with the same flux reversal per inch limitation.

A main feature of the invention is the increased packing density stored in the recording medium consistent with satisfactory discrimination and without the introduction of pulse crowding effects.

This and other advantages of the invention will become apparent from the following description and the accompanying drawings.

BRIEF DESCRIPTION OF THE DRAWINGS

FIG. 6 is a block diagram of a rotating magnetic cylindrical storage drum in a system environment embodying features of the invention.

FIG. 7 is one encoding scheme of the preferred embodiment of the invention.

FIG. 8 is a set of Boolean expressions for encoding the scheme of FIG. 7.

FIG. 9 is a graph illustrating examples of time varying readback signals.

FIG. 10 is an example of a configuration of data blocks and sync blocks utilized in the invention.

FIGS. 11*i* through 11*k* are a set of Boolean expressions for the decoding scheme of FIGS. 11*a* through 11*h*.

GENERAL DISCUSSION OF THE INVENTION

Figure 1:
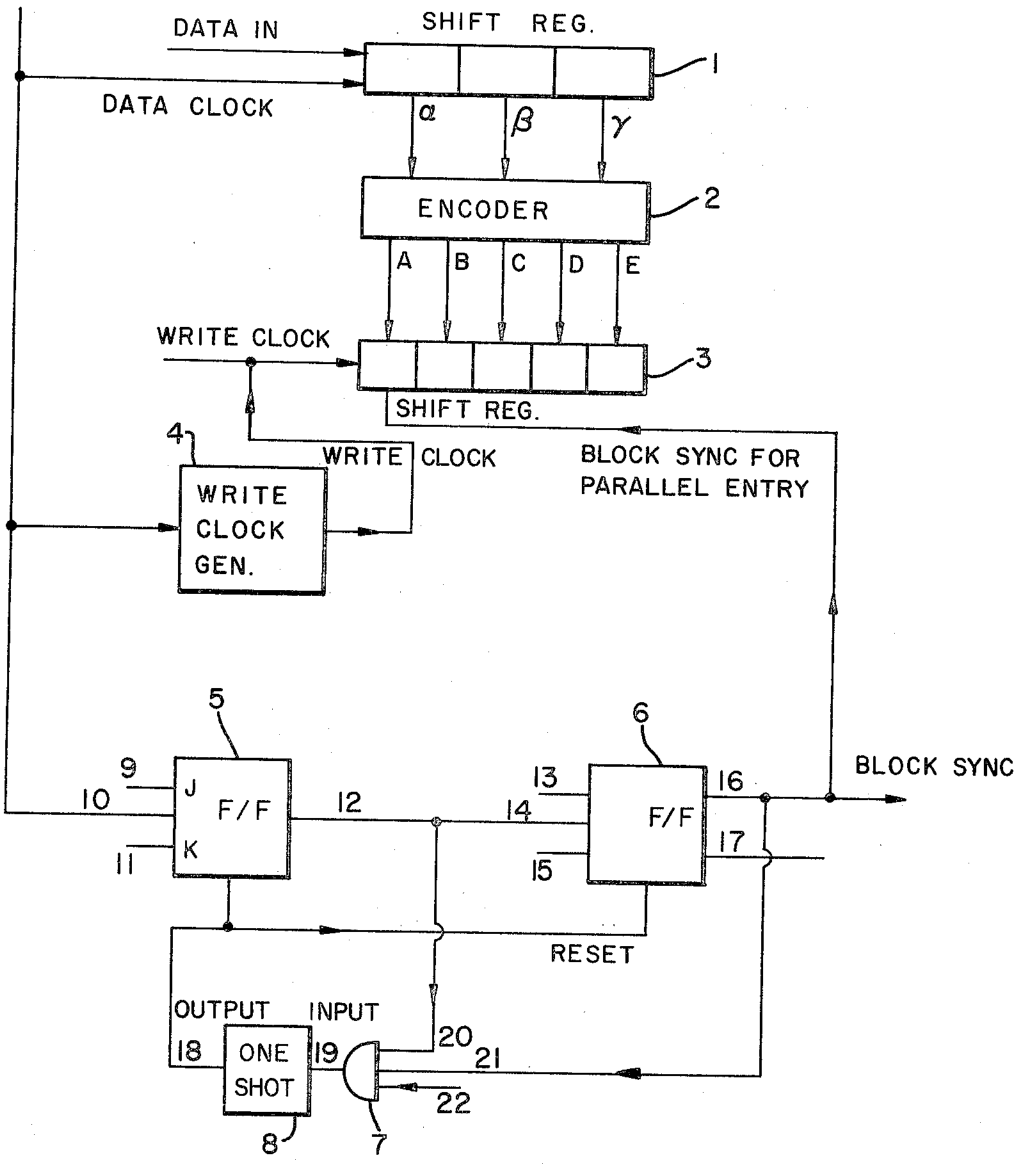
FIG. 1 is a diagram partially in block form illustrating the encoding and driving portion of a recording system in accordance with a preferred embodiment of the invention.

In delving through some of the prior art of magnetic recording systems of the type having magnetic drums, magnetic disks, or tape drives wherein data is recorded on data tracks in the surface of the recording medium, it has been seen that generally bit packing density is limited by pulse crowding affects which are aggravated by increasing the average number of flux reversals of transitions per inch. Improvements in the properties of the magnetic material can alleviate this situation somewhat, however, the attack of the problem to achieve more efficient recording has been in developing special data coding techniques, utilizing a minimum of additional hardware.

By limiting the average number of flux transitions per inch for each average bit of information stored, a more efficient encoding technique is possible which significantly improves the efficiency of recording. The encoding problem can be looked at as follows: it is desired to transmit $n$ bits of information and it is permissible to transmit $(2n-1)$ bits such that the total number "1's" transmitted (A "1" transmitted corresponds to a flux transition in, for example, a magnetic medium.) Therefore, by restricting the total number of "1's" for a fixed number of bits, it is possible to achieve a higher bit packing density with less pulse crowding affects with the same flux reversal per inch limitation. In this system, messages are arranged to be transmitted in blocks of $n$ bits; the encoding system is designed to take advantage of these message blocks, and since $(2n-1)$ bits are available for coding the $n$ bits to be transmitted, there are therefore $(2n-1)$ locations of single "1" bit codes — note, however, that $2^n$ codes are produced.

When $2^n$ is greater than $(2n-1)$ some codes are required with two "1" bits. The total number of such combinations is:

$$(2n-1)(2n-2)/2. \quad (1)$$

If we restrict ourselves to one and two bit codes, although any number such as K bit codes may be utilized, we have:

$$(2n-1)+(2n-1)(2n-2)/2=n(2n-1). \quad (2)$$

If $n(2n-1)$ is greater than $2^n$, the $n$ bit sequence can be uniquely coded with this one, two-bit code. In this process, the average number of "1" bits in $n$ bits of information is:

$$[(2n-1)+(2^n-2n+1)2]/2^n=2^{n+1}-(2n-1)/2^n. \quad (3)$$

Therefore, the average number per bit equals:

$$2/n-(2n-1)/n2^n. \quad (4)$$

Table I shows some values for various $n$.

TABLE I

| $n$ | $2^n$ | $n(2n-1)$ | $2/n-(2n-1)/n2^n$ |
|---|---|---|---|
| 2 | 4 | 6 | 5/8 |
| 3 | 8 | 15 | 11/24 |
| 4 | 16 | 28 | 25/64 |
| 5 | 32 | 45 | 11/32 |
| 6 | 64 | 66 | 39/128 |
| 7 | 128 | 91 | |

(The expression $[2/n-(2n-1)/n2^n]$ in Table I is equivalent to the average number of transitions or flux reversals per bit.)

As shown in the above table, $n$ cannot be taken greater than 6, and at the same time transmit only one or two "1" bits per $n$ bits because 91 is less than 128.

This table shows that there exists some one, two-bit codes for these $n$, but does not tell what the codes are. The codes are still to be generated. The case with $n=2$ gives an improvement from 1.5 reversals/bit for FM recording to 5/8-reversals per bit. Putting all those in a common denominator, Table II below is constructed to show the flux reversals per bit for various values of $n$.

TABLE II

| $n$ | reversals per 384 bits | reversals/bit |
|---|---|---|
| 2 | 240 | .62 |
| 3 | 176 | .45 |
| 4 | 150 | .39 |
| 5 | 132 | .34 |
| 6 | 117 | .30 |

It becomes obvious by a short perusal of the above table that a class of encoding methods is available each giving an improvement over the other with increasing $n$.

A typical code for $n=2$ is shown on Table III below where $\delta, \epsilon$ are the bits to be coded and F, G, H are the bits of the resulting code.

TABLE III

| $\delta$ | $\epsilon$ | F | G | H |
|---|---|---|---|---|
| 0 | 0 | 0 | 1 | 0 |
| 0 | 1 | 0 | 0 | 1 |
| 1 | 0 | 1 | 0 | 0 |
| 1 | 1 | 1 | 0 | 1 |

Another code for $n=3$ is shown in Table IV below where $\zeta, \eta, \theta$ are to be coded into I, J, K, L, M:

TABLE IV

| $\zeta$ | $\eta$ | $\theta$ | I | J | K | L | M |
|---|---|---|---|---|---|---|---|
| 0 | 0 | 0 | 1 | 0 | 0 | 0 | 0 |
| 0 | 0 | 1 | 0 | 1 | 0 | 0 | 0 |
| 0 | 1 | 0 | 0 | 0 | 1 | 0 | 0 |
| 0 | 1 | 1 | 0 | 0 | 0 | 1 | 0 |
| 1 | 0 | 0 | 0 | 0 | 0 | 0 | 1 |
| 1 | 0 | 1 | 0 | 1 | 0 | 1 | 0 |
| 1 | 1 | 0 | 0 | 0 | 1 | 0 | 1 |
| 1 | 1 | 1 | 0 | 1 | 0 | 0 | 1 |

Many other codes for $n=3$ are possible.

DESCRIPTION OF A PREFERRED EMBODIMENT

In a preferred embodiment of the present invention, there are 176 transitions per 384 bits or approximately 0.45 transitions per bit recorded in the appropriate track of the recording medium (see Table II).

Figures 4A, 4B, 4C, 4D, 4E, 4F, 4G, 4H, 4I, 4J:
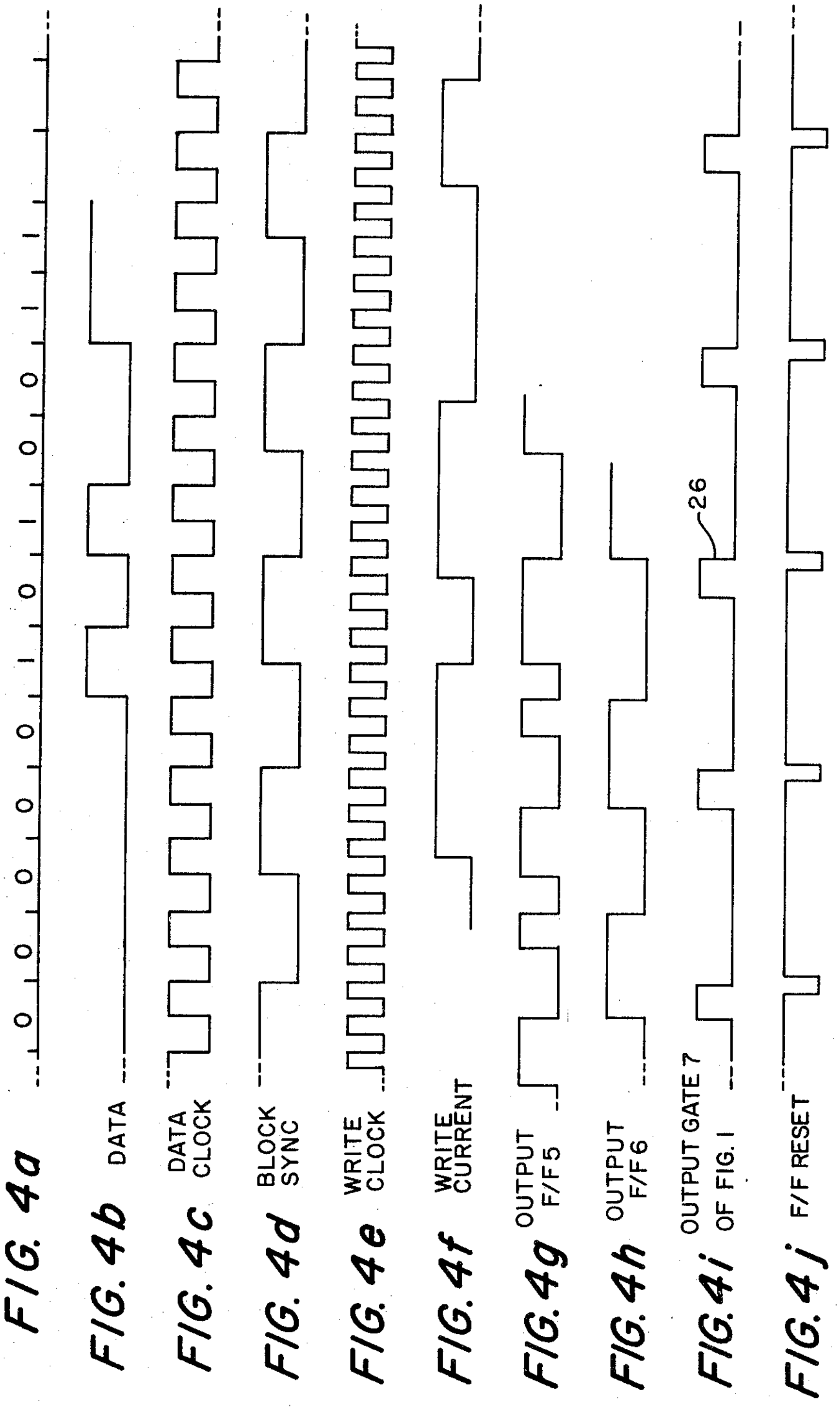
FIG. 4*a* is a diagrammatic representation of bit cells.
FIG. 4*b* is an example of a particular bit configuration of data input.
FIGS. 4*c* through 4*j* are various data and timing diagrams utilized in the encoding system.

FIG. 1 is a block diagram of an electrical circuit which will encode binary information in accordance with a code of the preferred embodiment of the invention and record the results in an appropriate magnetic recording track of a recording device similar to the type shown on FIG. 6. Binary information to be encoded and the data clock pulses for timing the data information are simultaneously fed as a block of three bits into a shift register 1. The outputs from the shift register 1 are coupled to an encoder 2 (to be later described in more detail), where they are encoded from a three bit code to a five bit code in accordance with the invention as shown on FIGS. 7 and 8. The output from the encoder 2 is fed in parallel to a five bit shift register 3. A write clock generator 4 is also coupled to the input of the shift register 3 and to the data clock. The write clock generator 4 may be any conventional frequency doubler circuit having as its input a stream of pulses such as the data clock shown on FIG. 4*c*, and having as its output a stream of write clock pulses shown on FIG. 4*e*, which are essentially at twice the frequency of the data clock pulses of FIG. 4*c*. The write clock pulses coupled to the shift register 3 clocks the shift register so that the serial output of the shift register 3 is the write current shown diagramatically on FIG. 4*f*. The data clock is also coupled to two flip-flops 5 and 6 and, together with AND gate 7 and one shot multi-vibrator 8, to which flip-flops 5 and 6 are coupled, are utilized to generate the block sync pulses by counting every three pulses of the data clock and generating a pulse block sync for every third data-clock pulse. The details of generating the block sync pulses are as follows: the data clock pulses on FIG. 4*c* are fed to the input of flip-flop 5 on FIG. 1; the inputs 9 and 11 of flip-flop 5 and inputs 13 and 15 of flip-flop 6 are high; the clock input 14 of flip-flop 6 is nothing more than the output 12 of flip-flop 5. When output 12 of flip-flop 5 (FIG. 4*g*) and output 16 of flip-flop 6 (FIG. 4*h*) are both high, and we have a data clock pulse transition from zero to one or from low to high, the one shot multi-vibrator 8 is triggered and resets the flip-flops 5 and 6 (FIG. 4*j*).

F/F (flip-flop) 5 changes state on the leading edge of the data clock or when reset by a reset pulse. F/F 6 changes state on the trailing edge of F/F 5 out (FIG. 4*g*) or when reset. With data clock (FIG. 4*c*) high, block sync (FIG. 4*d*) high, and output 12 (FIG. 4*g*) of F/F 5 high, then the output 19 of gate 7 goes high (pulse 26, FIG. 4*i*). Since output 19 of AND gate 7 is also the input to the one shot 8, it triggers the one shot multi-vibrator 8 on the trailing edge of pulse 26 and both F/F 5 and 6 are reset by F/F reset, FIG. 4*j*. (It will be observed that F/F 6 output, FIG. 4*h*, is equivalent to three times the data clock pulse, FIG. 4*c*.)

Figure 2A:
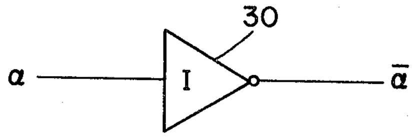
FIGS. 2*a* through 2*h* illustrate schematically in logic block diagram form the details of the encoding system in accordance with a preferred embodiment of the invention.
Figure 2B:
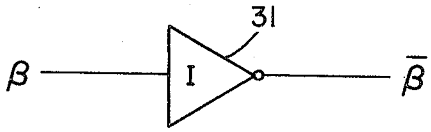
Figure 2C:
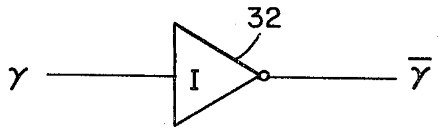
Figure 2D:
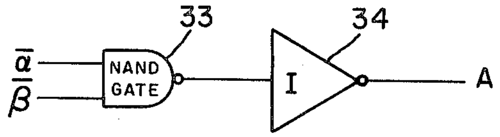
Figure 2E:
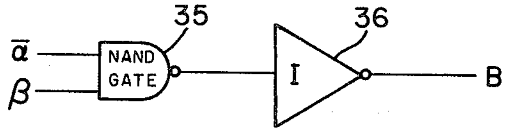
Figure 2F:
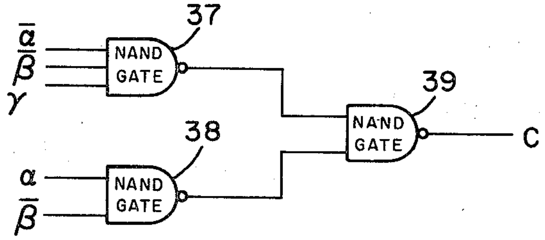
Figure 2G:
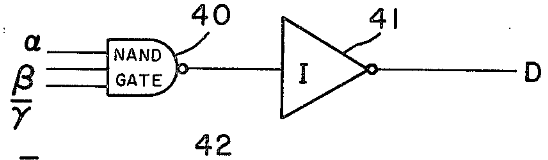
Figure 2H:
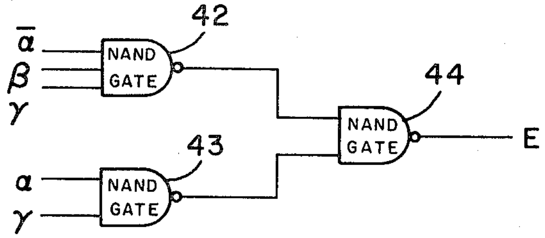

Referring now to FIGS. 2*a* through 2*h* and to FIGS. 7 and 8, a more detailed description of the encoding method from three bit to five bit code is given. The outputs $\alpha$, $\beta$, and $\gamma$ from shift register 1 of FIG. 1 are fed into the inputs of inverters 30, 31, and 32 respectively, of FIGS. 2*a*, 2*b*, and 2*c*, to give the outputs $\overline{\alpha}$, $\overline{\beta}$, and $\overline{\gamma}$ respectively. In the three bit shift register 1 of FIG. 1, $\alpha$ is the left most bit, $\beta$ is the middle bit, and $\gamma$ is the right most bit. As hereinbefore discussed, the outputs $\alpha$, $\beta$, and $\gamma$ of shift register 1 are fed in parallel into the encoder 2 of FIG. 1 which is shown in greater detail in FIGS. 2*d* through 2*h*. In FIGS. 2*d* through 2*h* the following reference numerals represent NAND gates: 33, 35, 37, 38, 39, 40, 42, 43, 44. The following reference numerals represent inverters: 34, 36, and 41. Referring to FIG. 2*d*, for example, it will be seen that A is "1" whenever $\alpha$ is "0" and $\beta$ is "0", or in other words, when $\overline{\alpha}$ is 1, and $\overline{\beta}$ is 1. If $\overline{\alpha} = 1$, and $\overline{\beta} = 1$ at the input of NAND gate 33, the output of NAND gate 33 is "0"; and the "0" input at the inverter 34 is a "1" output for inverter 34. By referring to FIGS. 7 and 8, it will readily be seen how the code of the invention is generated. A further example referring to FIGS. 2, 7, and 8 should serve to further clarify the encoder. For example, in FIG. 8, C is equal to "1" when $\overline{\alpha}$ is "1", $\overline{\beta}$ is "1", and $\gamma$ is "1" or when $\alpha$ is "1" and $\overline{\beta}$ is "1". Therefore, a logic circuit designed in accordance with there Boolean expressions will block encode the three bit binary number 100 to the five bit binary number 00100. By analogy, the Boolean expressions of FIG. 8 will encode a three bit binary code to a five bit binary code as seen in FIG. 2.

Figure 3A:
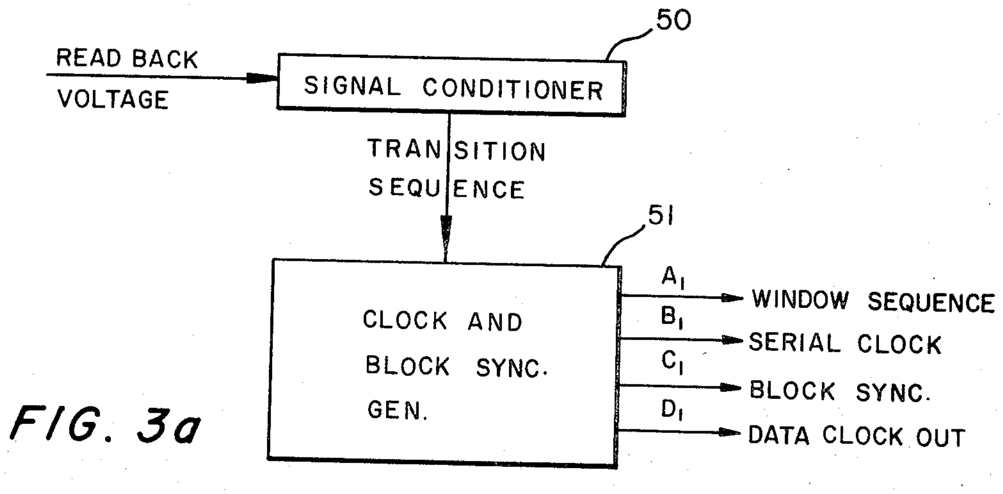
FIGS. 3*a* and 3*b* are diagrams partially in block form illustrating the decoding portion of a recording system in accordance with a preferred embodiment of the invention.
Figure 3B:
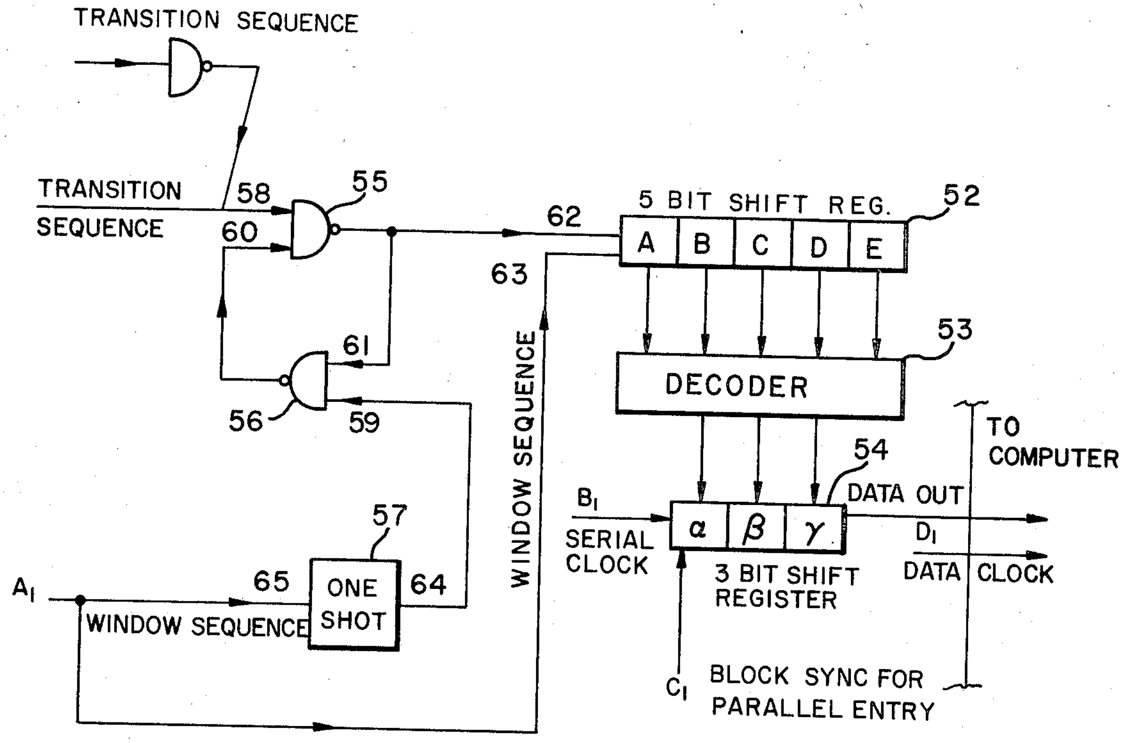
Figures 5A, 5B, 5C, 5D, 5E, 5F, 5G:
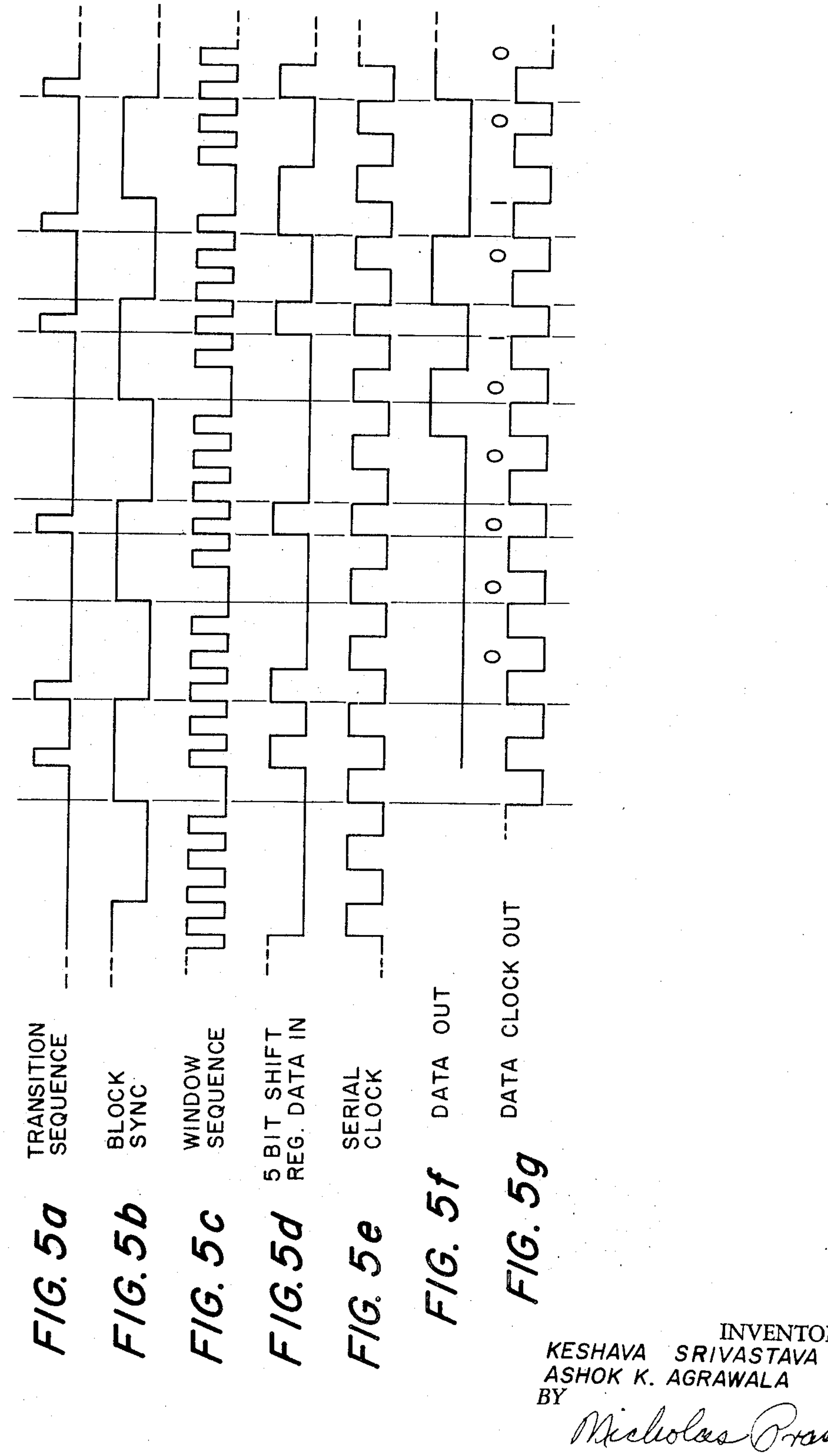
FIGS. 5*a* through 5*c*, and 5*e* and 5*g* are timing diagrams utilized in the decoding sequence of the invention.
FIGS. 5*d* and 5*f* are examples of particular bit configurations of data in and out of the decoding system.

Referring now to FIGS. 3*a* and 3*b*, a readback voltage readout by a magnetic head, not shown, of a magnetic disk-drive is fed into a signal conditioner 50; the signal conditioner performs various well-known operations on the signal utilizing conventional circuits, such as amplification, peak detection, signal shaping, and other operations. The output of the signal conditioner is a transition sequence of signals as shown in FIG. 5a. This transition sequence of signals is fed into a clock and block sync generator 51 similar to the one described in FIG. 1, and is utilized by the clock and the block sync generator 51 to generate a series of pulses at the output of clock and block sync generator 51, as follows:

$A_1$, window sequence shown in diagramtic form in FIG. 5*c;*

$B_1$, serial clock shown diagramatically in FIG. 5*e;*

$C_1$, block sync shown in FIG. 5*b;*

$D_1$, data-clock out shown in FIG. 5*g*.

The details of generating the above pulses is known in the art. Some references are as follows:

1. Serial clock is obtained by use of conventional phase locked loop techniques as described in;

a. "Phase Lock Techniques", by Floyd M. Gardner, John Wiley & Sons, 1967, b. "Monolithic Phase-Locked Signal Conditioner/Demodulator", by Dr. A. B. Grabene, Signetics Corp., 1970, c. Honeywell H273/H274 Operational Maintenance Manual - 60034962–002, Mar., 1970.

The block sync is generated from the serial clock by dividing by three utilizing a counting circuit similar to the counter of FIG. 1 previously described.

The window sequencer is generated by doubling the serial clock and removing every sixth pulse. (See FIG. 5*c*)

Finally, frequency doubling is obtained by using the phase lock loop techniques previously described in reference 1*a*, *b*, and *c* above.

The transition sequence (FIG. 5*a*) is also fed to NAND gate 55 (FIG. 3*b*), and output of NAND gate 55 to the five bit shift register 52; the output of NAND gate 55 is coupled to the input of NAND gate 56; also the output of NAND gate 56 is coupled to the input NAND gate 55. A one shot multi-vibrator 57 has its output 64 coupled to the input 59 of NAND gate 56. Hence, NAND gate 55 and 56 and one shot multi-vibrator 57 coupled in this manner comprise a latching NAND gate circuit which serves as a set-reset flip-flop. The set input of this latching NAND gate circuit flip-flop is labeled 58, and the reset input is labeled 59. The output of the NAND gate 55 is fed into the input (62) of the five bit shift register 52, and the circuit is reset by utilizing the positive edge of the window sequence pulse which is fed into the input 65 of the one shot multi-vibrator 57 and also into the input 63 of five bit shift register 52. If a transition occurs between a positive and a negative edge of a window sequence, the input 62 becomes high or "1", otherwise, it stays low or at "0"; on the negative edge of the window sequence, the output of NAND gate 55 is clocked into the input 62 of the five bit shift register 52; the positive edge of the window sequence triggers the one shot multi-vibrator 57 which outputs a very narrow pulse and is coupled to the input 59 of NAND gate 56 and thus resets NAND gate 56. The outputs of shift register 52 are coupled in parallel to a decoder 53, to be later described in greater detail.

The output of decoder 53 is coupled into the input of a three bit shift register 54, wherein the contents of the shift register 54 are clocked by serial clock pulses B1, derived from the clock and block sync generator previously referred to, in order to produce the serial data output. The decoded serial data output together with the data clock pulses are fed to the computer system (not shown). The block sync $C_1$ are the pulses that clock the information from the decoder into the shift register 54 in parallel.

Referring now to FIGS. 5*a* through 5*g*, the transition sequence of FIG. 5*a* is the output from the signal conditioner 50 on FIG. 3; the block sync $C_1$ of FIG. 5*b* is one of the outputs of the clock and block sync generator 51 of FIG. 3 and is utilized to clock the three bit shift register 54 of FIG. 3 for parallel entry of data from the decoder 53. The window sequence of pulses $A_1$ of FIG. 5*c* serves to divide the encoding block into five equal divisions or positions each position having significance in the code; therefore, each one of these pulses serves as a window between its positive and negative boundary to "look through" and determine if there is a transition sequence in that particular position, and thus determine whether there is a "1" or a "0" in that particular position. The input to the five bit shift register 52 of FIG. 3 is depicted by the five bit shift register data-in of FIG. 5*d*, and is gated into the five bit shift register on the negative edge of a window sequence pulse. The serial clock pulses of FIG. 5*e* are generated by the clock in block sync generator 51 of FIG. 3, and are utilized to clock the data out from the three bit shift register 54. The data-out pulses of FIG. 5*f* are the data-out of the three bit shift register 54 on FIG. 3; whereas the data clock-out pulses of FIG. 5*g* are fed together with the data-out pulses of FIG. 5*f* from the decoder device circuit to the computer system (not shown).

FIG. 6 is a block diagram of a rotating magnetic cylindrical storage drum in a system environment embodying the features of the invention. The magnetic drum 116 consists of circumferential tracks 126 of magnetically recorded information. Associated with each track 126 is a read/write head 136 which is in close proximity with a track and acts to erase, record, and recover information on the track. There is also a clock track 146 on the drum which is ordinarily written upon, only once. This clock track 146 is prerecorded and provides continuous clock pulses which are used for timing operations. There are two trains of clock pulses which indicate the mid-point and the end-point of a clock interval respectively; the rest of the rotating cylindrical magnetic drum surface contains the data tracks 126. The rotation of the drum 116 as indicated by arrow H, causes a changing magnetic flux from the tracks 126 to be detected by respective read/write heads 136 and thereby induces a playback signal in each head which is proportional to the time rate of change of the magnetic flux. When writing, a selected read/write head 136 itself is being electrically driven so as to induce a desired magnetic flux pattern onto the tracks 126. The read/write heads 136 are individually connected by two lines 196 to the head select circuitry 166. Included within the head select circuitry 166 is logic suitable for selecting the correct one of the plurality of read/write heads 136 to perform a particular reading or writing operation. Read circuit 176 and write circuit 186 perform their functions through the head selection circuitry 166. A particular operation using the read circuit 176 or the write circuit 186, and a particular head 136 activated by head select circuitry 166 are chosen in accordance with a command from a control unit 206 which operates in response to requests from a computer 216.

Figure 11A:
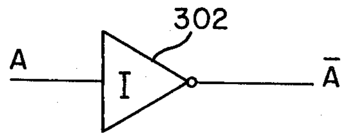
FIGS. 11*a* through 11*h* is, in logic block diagrams, one decoding scheme of the preferred embodiment of the invention.
Figure 11B:
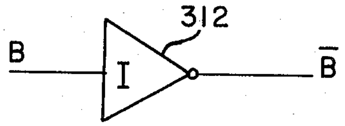
Figure 11C:
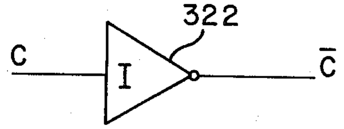
Figure 11D:
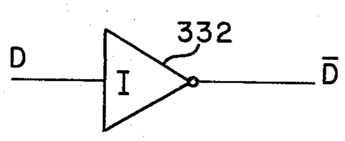
Figure 11E:
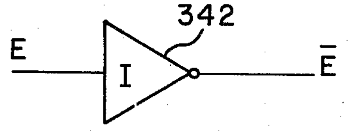
Figures 11F, 11G, 11H:
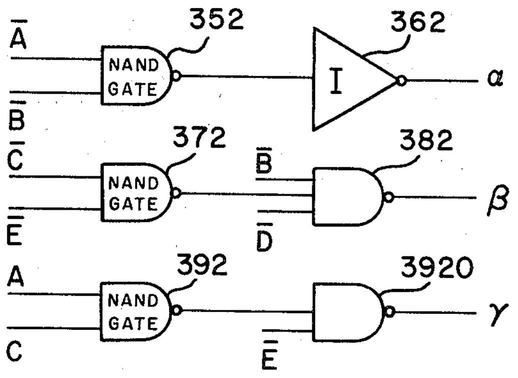

FIGS. 11*a* through 11*h* are the logic block diagrams for the decoder. As previously described with the encoder, the decoder has inverter amplifiers numbered as follows: 302, 312, 322, 332, 342, and 362. It also has NAND gates numbered as follows: 352, 372, and 392. The inverters invert an incoming signal, for example, in FIG. 11*a*, A is inverted to $\overline{A}$ or a high to a low voltage and vice versa. The logic block diagrams of FIGS. 11*f* through 11*h* are the mechanization of Boolean expressions of FIGS. 11*i* through 11*k*, where 11*f* corresponds to 11*i*; 11*g* corresponds to 11*j*; 11*h* corresponds to 11*k*. In FIG. 11*f* for example, $\alpha$ is "1" when $\overline{A}$ is "1" and $\overline{B}$ is "1"; in FIG. 11*g*, $\beta$ is "1" when B is "1" or D is "1" or $\overline{C}$ and $\overline{E}$ are "1"; in FIG. 11*h*, $\gamma$ is "1" when A and C are "1" or E is "1".

With this decoder, the five bit encoded information of FIG. 7, A, B, C, D, and E is decoded back to three bit original information $\alpha$, $\beta$, and $\gamma$.

In the block encoding system of the present invention, described in the preceding pages, a data block of bits is converted into a unique sequence of flux reversals. If each flux reversal could be picked up uniquely and exactly at the point where it was recorded, it would only be necessary to take care of the variations due to noise. However, additional variational effects creep in and are due to the readback pulse shape, which is "-Gaussian" in nature and therefore interferes with the pulses before it, as well as with those after it. This accounts for the inter-symbol interference and peak shifts (see FIG. 9). FIG. 9 shows a time diagram having one block time $t_b$ wherein the readback voltage signal 717 is shown varying with time $t_b$, and a noise signal 727 is also shown varying with time $t_b$. For the duration of our block time $t_b$, only one of eight (for a block of three bits) time signals can occur. This would not ordinarily be difficult to detect but for the variations due to (*a*) noise, and (*b*) the "Gaussian" effect which gives intersignal interference. The variation due to the pulse interaction will be a maximum towards the end of $t_b$ and minimum in the middle, because each pulse is effected by its three neighboring pulses on either side. The result of the pulses in the middle for $f^i(t)$ (for the $i$'th bit configuration $i$=1,8) has some neighbors, and hence, least variations.

To decrease the jitter at its origin, good synchronization is required and this is accomplished by placing a sync block after a given number of data blocks as shown diagramatically on FIG. 10.

By accurately synchronizing the clock in the sync block, the jitter for the $j$'th block from any sync block will be a linear function of $j$. By determining the allowable jitter for efficient readback, the of the sync block is determined. The sync block may have a three flux reversal pattern, and since the peak of the middle pulse does not shift significantly, it can be used for synchronization purposes.

While only a preferred embodiment of the present invention has been shown and described, many modifications will be apparent to those skilled in the art and within the spirit and scope of the invention as set forth in particular in the appended claims.

What is claimed is:

1. A system for encoding blocks of $n$ bits representing binary information into a sequence of transitions comprising:
   A. encoding means for encoding said block of $n$ bits of information into a configuration of presences and absences of transitions within the bounds of a prescribed maximum number $k$ of transitions per block such that the average transition per bit follows the prescribed relationship $$[2/n-(2n-1)/n2^n]$$

and wherein said encoding means further comprise
   a. a plurality of NAND gate means each NAND gate means including input and output terminals each of said NAND gate means for enabling an output signal in response to a predetermined pattern of input signals; and
   b. inverting means coupled to selected ones of said NAND gates means for inverting an applied signal.

2. A system for encoding blocks of n bits representing binary information into a sequence of transitions as recited in claim 1 wherein said input terminals of said plurality of NAND gate means receive a predetermined pattern of input signals representing an $\alpha$, $\beta$ and $\gamma$ pattern of bits, and wherein said inverting means output electric signals representing an A, B, C, D, and E pattern of bits and wherein said NAND gate means and said inverter means are coupled to each other in accordance with the following Boolean expressions:

$A=\overline{\alpha}\,\overline{\beta}$ $B=\overline{\alpha}\beta$ $C=\overline{\alpha}\,\overline{\beta}\gamma+\alpha\overline{\beta}$ $D=\alpha\beta\overline{\gamma}$
$E=\overline{\alpha}\beta\gamma+\alpha\gamma$.

3. A system for encoding blocks of n bits representing binary information into a sequence of transitions as recited in claim 2 including:
   a. a first shift register for storing a block of *n* bits of information said first shift register coupled to said NAND gate means;
   b. a second shift register coupled to said inverter means said second shift register for storing at least five bits of information.

4. A system for encoding blocks of *n* bits representing binary information into a sequence of transition as recited in claim 2 including:
   a. a first shift register for storing a block of *n* bits of information coupled to said NAND gate means;
   b. a second shift register coupled to said inverter means said second shift register for storing at least five bits of information;
   c. and also including clocking and driving means coupled to said first and second shift registers said clocking and driving means for clocking and driving data pulses representing the bits of information in and out of said first and second shift registers.

5. An encoder for encoding blocks of *n* bits of information positionally represented by $\alpha$, $\beta$ and $\gamma$ into a configuration of *k* bits of information positionally represented by A, B, C, D, and E comprising:
   a. a plurality of NAND gate means each NAND gate means having a plurality of input terminals and at least one output terminal said input terminals for applying electric signals to said plurality of NAND gate means representative of $\alpha$, $\beta$ or $\gamma$ bits and said output terminals of said plurality of NAND gate means for abstracting electric signals representative of A, B, C, D, or E bits,
   b. a plurality of inverter means at least one each coupled to one each of said plurality of NAND gate means said inverter means for inverting electric signals applied to or abstracted from said NAND gate means,
   c. said combination of NAND gate means and inverter means logically coupled to said encoder in accordance with the following Boolean expressions, $A=\overline{\alpha}\overline{\beta}$
$B=\overline{\alpha}\beta$
$C=\overline{\alpha}\overline{\beta}\gamma+\alpha\overline{\beta}$
$D=\alpha\beta\overline{\gamma}$
$E=\overline{\alpha}\beta\gamma+\alpha\gamma$.

6. An encoder for encoding a pattern of *n* bits of information represented by $\alpha$, $\beta$ and $\gamma$ into a pattern of *k* bits of information represented by A, B, C, D, and E comprising:
   a. a plurality of NAND gate means each NAND gate means having a plurality of input terminals and at least one output terminal said input terminals for applying electric signals to said plurality of NAND gate means representative of $\alpha$, $\beta$ or $\gamma$ bits and said output terminals of said plurality of NAND gate means for abstracting electric signals representative of A, B, C, D or E bits,
   b. a plurality of inverter means logically coupled to said plurality of NAND gate means in accordance with the following Boolean expressions, $A=\overline{\alpha}\overline{\beta}$
$B=\overline{\alpha}\beta$
$C=\overline{\alpha}\overline{\beta}\gamma+\alpha\overline{\beta}$
$D=\alpha\beta\overline{\gamma}$
$E=\overline{\alpha}\beta\gamma+\alpha\gamma$, said inverter means for inverting electric signals applied or extracted from said NAND gate means,
   c. and wherein the n pattern of bits represented by $\alpha$, $\beta$ and $\gamma$ are translated by said encoder into the k pattern of bits represented by A, B, C, D, and E in accordance with the following pattern,

| $\alpha$ | $\beta$ | $\gamma$ | A | B | C | D | E |
|---|---|---|---|---|---|---|---|
| 0 | 0 | 0 | 1 | 0 | 0 | 0 | 0 |
| 0 | 0 | 1 | 1 | 0 | 1 | 0 | 0 |
| 0 | 1 | 0 | 0 | 1 | 0 | 0 | 0 |
| 0 | 1 | 1 | 0 | 1 | 0 | 0 | 1 |
| 1 | 0 | 0 | 0 | 0 | 1 | 0 | 0 |
| 1 | 0 | 1 | 0 | 0 | 1 | 0 | 1 |
| 1 | 1 | 0 | 0 | 0 | 0 | 1 | 0 |
| 1 | 1 | 1 | 0 | 0 | 0 | 0 | 1 |

7. An encoder as recited in claim 6 including first shift register means coupled to said encoder for storing and shifting said configuration of bits represented by $\alpha$, $\beta$ and $\gamma$, and second shift register means for storing and shifting said configuration of bits represented by A, B, C, D, and E.

8. An encoder as recited in claim 7 further including timing means coupled to said first and second shift register means for clocking the electric signals representing the information and coded bits into and out of said first and second shift registers, driving and counting means coupled to said encoder for clocking and driving the electric signals representing the information and coded bits into and out of said encoder according to a prescribed count.

9. A system for recording binary information serially in blocks in a track of a recording medium comprising:
   A. a recording medium operable to store binary information in two distinct states, one of the states representing a "0" and the other state representing a "1";
   B. read/write head means for recording one or the other of the states representing a "0" or a "1" in a portion of the track of said recording medium;
   C. first and second storage means for storing uncoded and encoded data respectively;
   D. encoding means coupled to said first and second storage means and to said read/write head means for encoding the serial pattern of bits of information in blocks into a pattern of presences and absences of transitions, such patterns having substantially an average of 0.45 transitions per bit, said encoding means further comprising,
      a. a plurality of NAND gates for receiving a pattern of electric signals representing an $\alpha$, $\beta$ and $\gamma$ pattern of "0" and "1" bits,
      b. a plurality of inverter means logically coupled to said plurality of NAND gates logically coupled in accordance with the following Boolean expression:

$A=\overline{\alpha}\overline{\beta}$
$B=\overline{\alpha}\beta$
$C=\overline{\alpha}\overline{\beta}\gamma+\alpha\overline{\beta}$
$D=\alpha\beta\overline{\gamma}$
$E=\overline{\alpha}\beta\gamma+\alpha\gamma$ where A, B, C, D, and E represent a pattern of electric signals representing the encoded output of "0'" and "1's".

10. A method of writing binary words with a block encoding and recording technique operating to store binary words in a recording medium comprising the steps of:

a. grouping binary information into a first pattern of "1's" and "0's" having a maximum of *n* bits per group said group of n bits represented by $\alpha$, $\beta$ and $\gamma$;

b. translating said first pattern of "1's" and "0's" into presences and absences of transitions of electric signals respectively;

c. encoding said translated presences of transitions of electric signals into a second group of presences and absences of transitions of electric signals representing "1's" and "0's" respectively, said second group having a maximum of *k* bits per group said group of *k* bits represented by A, B, C, D, and E; and wherein said pattern of bits of information represented by $\alpha$, $\beta$ and $\gamma$ is encoded into the pattern of bits of information represented by A, B, C, D, and E in accordance with the following pattern:

| α | β | γ | A | B | C | D | E |
|---|---|---|---|---|---|---|---|
| 0 | 0 | 0 | 1 | 0 | 0 | 0 | 0 |
| 0 | 0 | 1 | 1 | 0 | 1 | 0 | 0 |
| 0 | 1 | 0 | 0 | 1 | 0 | 0 | 0 |
| 0 | 1 | 1 | 0 | 1 | 0 | 0 | 1 |
| 1 | 0 | 0 | 0 | 0 | 1 | 0 | 0 |
| 1 | 0 | 1 | 0 | 0 | 1 | 0 | 1 |
| 1 | 1 | 0 | 0 | 0 | 0 | 1 | 0 |
| 1 | 1 | 1 | 0 | 0 | 0 | 0 | 1; |

d. and recording the second group of presences and absences of transitions of electric signals consecutively and contiguously in blocks of prescribed bit length in said recording medium.

11. The method according to claim 10 wherein *n* is 3 and *k* is 5.

12. The method according to claim 10 wherein the recording medium is composed of magnetizable material and said transitions of electric signals causes magnetic flux reversals in said medium.

13. An apparatus for recording binary information in blocks of a prescribed number of bits comprising:

a. computer means for generating binary words of *n* bits;

b. medium means in said computer means for receiving and storing binary words;

c. translating means responsive to said computer means for converting binary words comprised of n bits into binary words comprised of *k* bits each bit represented by the presence or absence of transitions, said words of *n* bits having a maximum number K of transitions per word such that the average transitions per bit is in accordance to a prescribed relationship as follows, $$[2/n-(2n-1)/n2^n],$$

and wherein said translating means comprise,

A. NAND gate means coupled to said translating means for generating an output signal in response to a predetermined pattern of presences and absences of input signals, and B. inverter means coupled to said NAND gate means for inverting an electric signal applied to its input terminal, said NAND gate means and inverter means coupled to said translating means in accordance with the following Boolean expressions, $A=\overline{\alpha}\,\overline{\beta}$ $B=\overline{\alpha}\beta$ $C=\overline{\alpha}\,\overline{\beta}\gamma+\alpha\overline{\beta}$ $D=\alpha\beta\overline{\gamma}$ $E=\overline{\alpha}\beta\gamma+\alpha\gamma,$ where A, B, C, D, and E represent output signals from said combined NAND gate and inverter means and $\alpha$, $\beta$ and $\gamma$ represent input signals to said combined NAND gate and inverter means;

d. and writing means coupled to said translating means and to said medium means for recording said binary word of n bits in said medium means.

14. An apparatus for recording binary information in blocks as recited in claim 13 including synchronizing clock means for inserting a sync block for a prescribed number of information blocks.

15. A decoder for decoding blocks of bits of information positionally represented by A, B, C, D, and E into a configuration of bits of information positionally represented by $\alpha$, $\beta$, and $\gamma$ comprising:

a. first shift register means for storing and shifting the A, B, C, D, and E configuration of bits;

b. second shift register means for storing and shifting the $\alpha$, $\beta$, and $\gamma$ configuration of bits;

c. and decoding means coupled to said first and second shift register means for translating said bits of information represented by A, B, C, D, and E into bits of information represented by $\alpha$, $\beta$, and $\gamma$.

16. A decoder for decoding blocks of bits of information positionally represented by A, B, C, D, and E into a configuration of bits of information positionally represented by $\alpha$, $\beta$ and $\gamma$ comprising:

a. first shift register means for storing and shifting the A, B, C, D and E configuration of bits;

b. second shift register means for storing and shifting the $\alpha$, $\beta$ and $\gamma$ configuration of bits;

c. and decoding means coupled to said first and second shift register means for translating said bits of information represented by A, B, C, D and E into bits of information represented by $\alpha$, $\beta$ and $\gamma$, said decoding means comprising, A. NAND gate means for generating output signals in response to predetermined patterns of presences and absences of input signals, B. inverter means coupled to said NAND gate means for inverting input electric signals applied to their input terminals, said combination of NAND gate means and inverter means coupled to said decoding means in accordance with the following Boolean expressions:

$\alpha=\overline{A}\,\overline{B}$ $\beta=B+D+\overline{CE}$ $\gamma=E+AC.$

17. A decoder as recited in claim 16 wherein the decoding means translates a pattern of bits of information represented by A, B, C, D, and E into a pattern of bits of information represented by $\alpha$, $\beta$, and $\gamma$ in accordance to the following pattern:

| A | B | C | D | E | $\alpha$ | $\beta$ | $\zeta$ |
|---|---|---|---|---|---|---|---|
| 1 | 0 | 0 | 0 | 0 | 0 | 0 | 0 |
| 1 | 0 | 1 | 0 | 0 | 0 | 0 | 1 |
| 0 | 1 | 0 | 0 | 0 | 0 | 1 | 0 |
| 0 | 1 | 0 | 0 | 1 | 0 | 1 | 1 |
| 0 | 0 | 1 | 0 | 0 | 1 | 0 | 0 |
| 0 | 0 | 1 | 0 | 1 | 1 | 0 | 1 |
| 0 | 0 | 0 | 1 | 0 | 1 | 1 | 0 |
| 0 | 0 | 0 | 0 | 1 | 1 | 1 | 1 |

18. A binary coding method for magnetic recording wherein "1's" represent a flux reversal and "0's" represent no flux reversal said method comprising:

a. encoding data comprised of $n$ bits of information into blocks of $k$ bits of information; and b. restricting the average number of "1's" per bit in the blocks of $k$ bits of information in accordance with the following relationship, $$[2/n-(2n-1)/n2^n].$$

19. The method of claim 18 wherein $n$ equals 2 and $k$ equals 3.

20. The method of claim 18 wherein $n$ equals 3 and $k$ equals 5.

21. A binary coding method for electrically coding a pattern of $n$ bits of binary information represented by "1's" and "0's" and positionally represented by $\alpha, \beta, \gamma$. . . into a pattern of $k$ bits of binary information positionally represented by A, C, B, D, E, . . . comprising:

a. electrically encoding the $n$ bits of information into $k$ bits of information, b. restricting the average number of "1's" per bit in the pattern of $k$ bits in accordance with the following relationship $$[2/n-(2n-1)/n2^n].$$

22. A binary coding method for optically coding a pattern of $n$ bits of binary information represented by "1's" and "0's" and positionally represented by $\alpha, \beta, \gamma$. . . into a pattern of $k$ bits of binary information represented by "1's" and "0's" and positionally represented by A, B, C, D, E, . . . comprising:

a. optically encoding the n bits of information into $k$ bits of information, b. restricting the average number of "1's" per bit in the pattern of $k$ bits in accordance with the following relationship $$[2/n-(2n-1)/n2^n].$$

23. The method of claim 22 wherein said pattern of bits of information represented by $\alpha$, $\beta$ and $\gamma$ is encoded into the pattern of bits of information represented by A, B, C, D, and E in accordance with the following pattern:

| $\alpha$ | $\beta$ | $\gamma$ | A | B | C | D | E |
|---|---|---|---|---|---|---|---|
| 0 | 0 | 0 | 1 | 0 | 0 | 0 | 0 |
| 0 | 0 | 1 | 1 | 0 | 1 | 0 | 0 |
| 0 | 1 | 0 | 0 | 1 | 0 | 0 | 0 |
| 0 | 1 | 1 | 0 | 1 | 0 | 0 | 1 |
| 1 | 0 | 0 | 0 | 0 | 1 | 0 | 0 |
| 1 | 0 | 1 | 0 | 0 | 1 | 0 | 1 |
| 1 | 1 | 0 | 0 | 0 | 0 | 1 | 0 |
| 1 | 1 | 1 | 0 | 0 | 0 | 0 | 1. |

* * * * *